Sept. 25, 1962
L. J. MEYER
3,055,486
PIVOTED BUCKET CARRIER
Filed Nov. 2, 1959
3 Sheets-Sheet 1
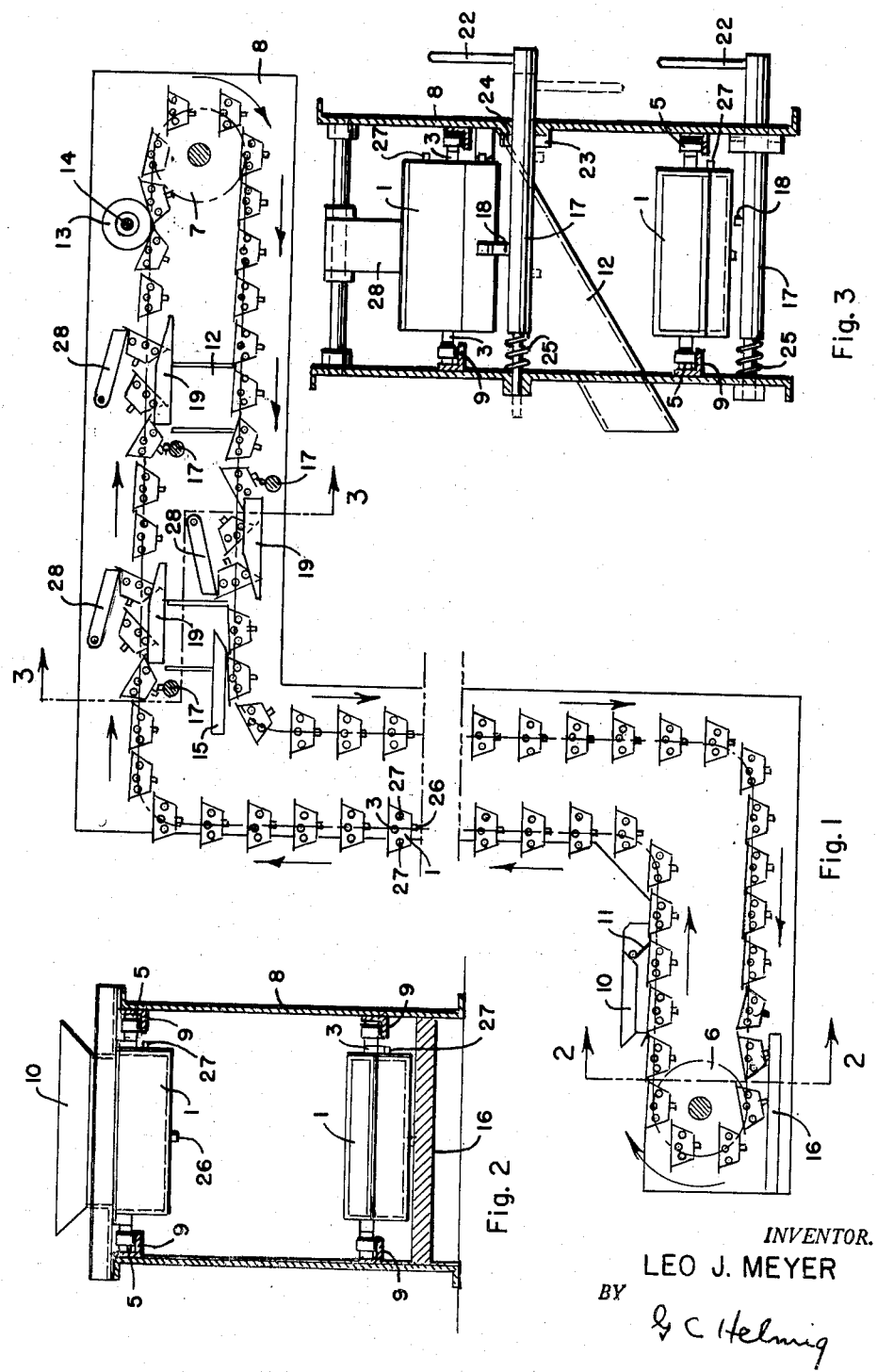
INVENTOR.
LEO J. MEYER
BY
*G C Helmig*

Sept. 25, 1962 L. J. MEYER 3,055,486
PIVOTED BUCKET CARRIER
Filed Nov. 2, 1959
3 Sheets-Sheet 2

INVENTOR.
LEO J. MEYER
BY

Sept. 25, 1962 L. J. MEYER 3,055,486
PIVOTED BUCKET CARRIER
Filed Nov. 2, 1959
3 Sheets-Sheet 3
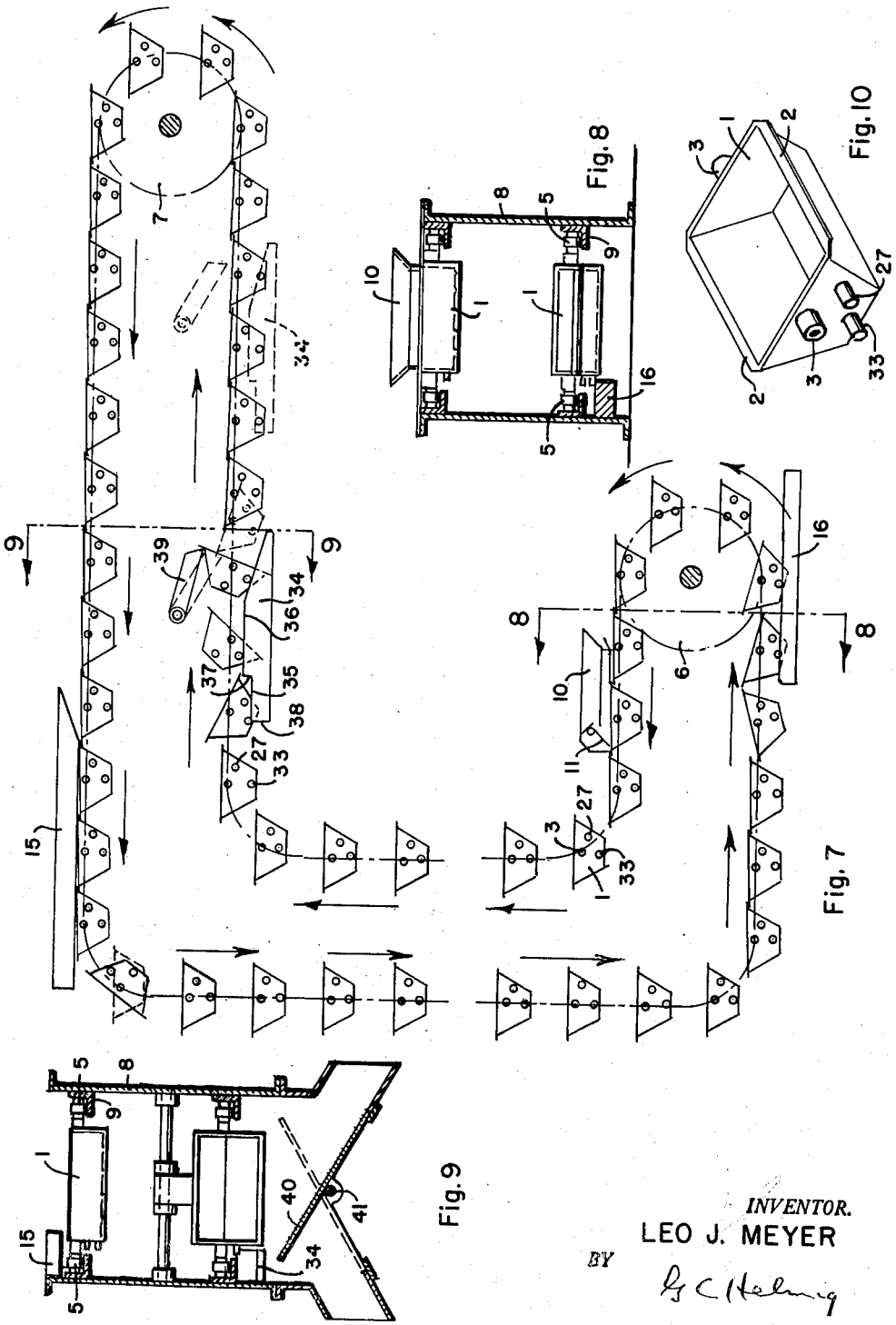
INVENTOR.
LEO J. MEYER
BY

UNITED STATES PATENT OFFICE 3,055,486
Patented Sept. 25, 1962

3,055,486
PIVOTED BUCKET CARRIER
Leo J. Meyer, % Meyer Machine Co., P.O. Box 5096,
San Antonio, Tex.
Filed Nov. 2, 1959, Ser. No. 850,341
3 Claims. (Cl. 198—145)

This invention relates to a pivoted bucket type carrier especially adapted for transferring granular or powdered materials from loading to unloading stations and more particularly to a machine assembly having a succession of tiltably suspended buckets which travel continuously through a loop circuit and automatically tilt to dump position at an unloading point after having been filled and transported, without spillage loss. The elimination of droppings avoids waste and is of importance in the handling and packaging of foods for human consumption and to the maintenance of a clean processing plant.

It is an object of the invention to provide swingable conveyor buckets pivotally suspended above their centers of gravity for a tiltable and self-righting hanging thereof and arranged in close longitudinal succession and provided with longitudinally projecting flanges at their upper transverse edges to overlap and close gaps between adjoining buckets as retainer baffles against downstream flow in by-passing relation with the buckets and loss of material being fed by descent into the buckets as they pass under a delivery hopper and which swingable buckets can be caused to tilt at various points in their travel, both for freeing the overlapping flanges from interference to negotiation by the traveling buckets of loop circuit turns and for otherwise conditioning the buckets for required swinging manipulations.

Another object of the invention is to provide improved and simplified bucket dumping mechanisms for automatically unloading the bucket content and for controlling or apportioning delivered quantities at each of several receiving stations by selecting according to predetermined patterns the relative numbers of buckets to be unloaded at given stations.

A further object of the invention is to provide a conveyor bucket machine which can be quickly adjusted and set up for unloading, as desired, of none, all or any number of buckets at any of a series of stations whereby to match the rate of material used or required, as, for example, in an installation for delivering to a bank of packaging machines certain of which handle larger or smaller quantities than others or are at times temporarily idle and out of operation.

Figure 5:
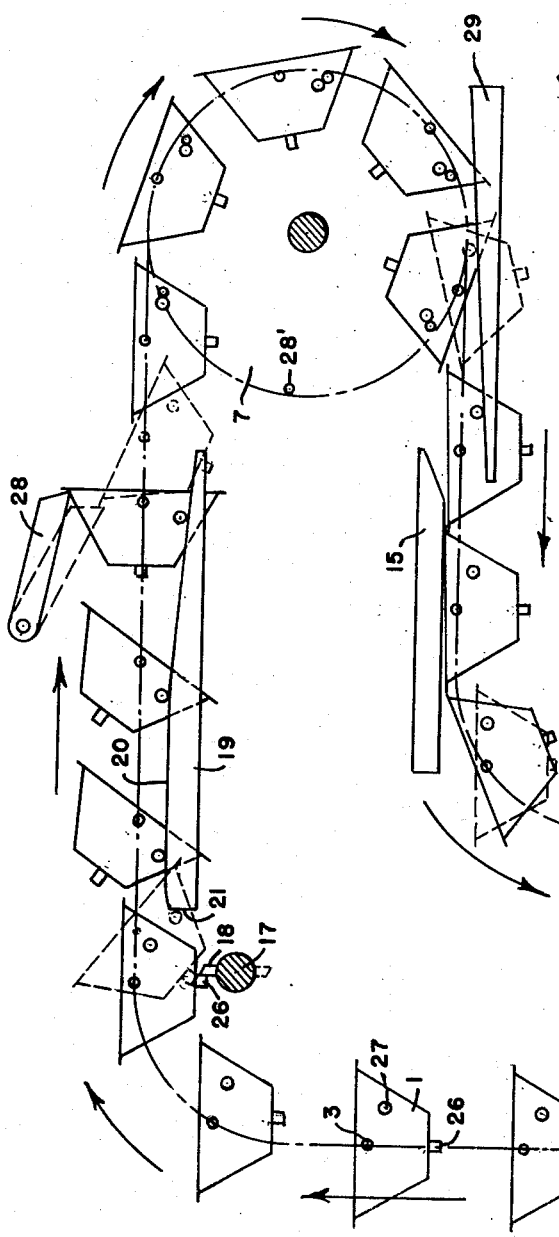
Figure 4:
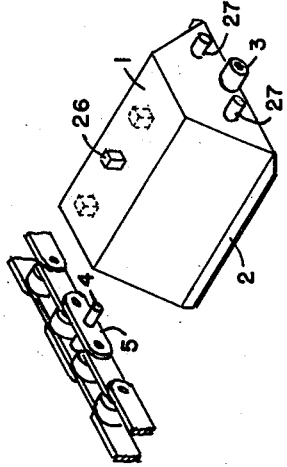
Figure 6:
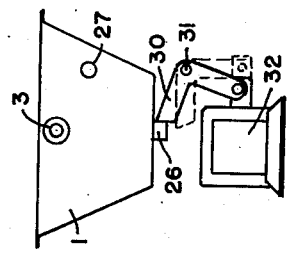

Other objects and advantages will become apparent from the following specification having reference to the accompanying drawings wherein FIG. 1 is a somewhat diagrammatic side elevation of a material conveying and elevating machine according to one embodiment of the invention; FIGS. 2 and 3 are transverse sections taken respectively on lines 2—2 and 3—3 of FIG. 1; FIG. 4 shows in perspective an inverted bucket and a fragment of an endless carrier chain forming parts of the machine shown in FIG. 1; FIG. 5 is a larger scale side elevation of the upper head portion of the machine wherein all buckets turn upside down as they pass around a chain loop end sprocket or guide wheel for unloading any bucket not previously emptied at an earlier unloading station; FIG. 6 is a side elevation of a solenoid controlled stop engageable with an abutment on a traveling pivoted bucket for tilting the bucket as part of the upending operation; FIG. 7 is a side elevation diagraming a modified machine; FIGS. 8 and 9 are transverse sections on lines 8—8 and 9—9 respectively of FIG. 7' and FIG. 10 is a perspective view of a tilting bucket as in FIG. 7.

The drawings indicate that the machine here involved has been designed for versatility in that it can be built to fit different height and length requirements for various installations as to location, number and selectivity of loading and unloading stations. The machine is well adapted for preassembly and shipment in sectional units and quick final assembly at operating location by joining subassembly units in either totally enclosed or open types constructions. Various arrangements are feasible for discharge at chosen levels and to one or the other side or directly downwardly, as may be dictated by placement of receiving bins or hoppers of a group of packaging machines. FIG. 1 illustrates a machine whose bucket circuit follows a substantial Z-shape elongated path comprised of a vertical riser section joining a lower horizontal leg containing a loading station and an upper horizontal leg, which is of any desired length and contains a group of unloading stations selectively located in either or both the bottom return loop section for discharge directly downwardly and in the forwardly advancing upper loop section for discharge into laterally directed inclined chutes. For longitudinal compactness, the FIG. 7 loop circuit is of generally C-shaped and provides a low level loading station vertically beneath the top leg containing unloading stations in a lower advancing section of the chain loop. For an unloading station at the elevated end of the carrier loop circuit, the buckets can be arranged to co-operate with the end sprocket wheel for dumping purposes, as seen in FIG. 5.

The material handling pans or buckets 1, as best seen in FIGS. 4 and 10, are preferably made up of light metal such as stainless steel or aluminum for promoting cleanliness and may be pressed to shape or economically formed by welding thin flat plates including downwardly convergently related front and rear walls, vertical end walls and a horizontal bottom wall. Outwardly projecting horizontal flanges 2 are extended from the upper top edges and throughout the length of the front and rear walls for short distances in the longitudinal travel direction and are to overlap one another for closing the gap or intervening space between adjoining buckets, particularly during a filling operation at a loading station. Just below the upper bucket edges and centrally of the opposite end plates are secured outwardly projected hollow or tubular bearing bosses 3 whose openings are in axial alignment transversely of the bucket and receive pivot studs or pins 4 projecting inwardly from endless roller chain assemblies 5, one at each side of the line of buckets. The several buckets are individually pivotally suspended on transverse axes above their centers of gravity and in close coupled tandem and longitudinal succession between a pair of transversely spaced apart chains 5 whereby normally each bucket hangs down in upright position under its own weight but can be forced to swing to tilted and upside down positions.

Preferably, the bucket suspension shafts or axle pins 4 are not mere extensions of the relatively small diameter chain link connector pins on which the rollers are rotatably mounted, but as seen in FIG. 4, the projected bucket hinge pins 4 each has its outer end passed through and secured to both of a co-operating pair of side links of the chain assembly and in an intermediate region spaced from the link end connections. The simple addition of a larger and more husky suspension pin to a standard chain reduces manufacturing costs and affords a much stronger and reliable hinged bucket suspension connection.

The two bucket carrying chains 5 travel through a loop circuit and are entrained at opposite loop ends on sprocket or guide wheels 6 and 7 rotatably mounted by machine side frame members 8. Suitable adjustable slack take-up devices are contemplated for mounting the wheel bearings and one or the other of the wheels 6 and 7 will be drive connected with power transmitting mechanism. In the FIG. 1 embodiment, the traveling chain and bucket assembly moves through a top loop reach comprising upper and lower horizontal end sections and an intermediate vertical elevator section and the bottom loop reach also comprises upper and lower horizontal end sections and an intermediate vertical descending section. Except at the end sprockets, the chain rollers are guided and track on frame mounted carriers or rails 9 which in the several horizontal loop sections can be inwardly extending flanges of angle iron straps and in the vertical loop sections and also at the turns in the travel path can be afforded by spaced apart flanges of a co-operating pair of angle straps or of a channel section rail.

Instead of a single longitudinal row of pivoted buckets, there may be employed two or more rows in side by side relation and the buckets in any row can be of the same or of different capacities than those in another row, depending on volume requirements of packaging machines to be served. In the case of multiple side by side rows, the pivot pin bosses along adjacent sides of adjoining rows will be mounted on pins projecting from opposite sides of a single carrier chain operating between the rows.

Material to be conveyed and elevated to high level unloading stations is conveniently loaded near the factory floor level by introduction into a hopper 10 overlying the forwardly moving buckets in the bottom leg of the loop. The material drops through the bottom of the hopper 10 directly into the space within the buckets and a minimum clearance exists between the upper surfaces of the buckets and the bottom edges of the hopper. In width, the hopper discharge opening, as can be seen in FIG. 2, is slightly exceeded by the transverse dimension of the bucket cavity. These relationships, together with the closure of intervening gaps between successive buckets by reason of the longitudinally extending overlapping flanges 2, reduce and eliminate material overflow and spillage at the loading station. Further to avoid loss of material, the lower transverse wall portion of the feed hopper and to the rear thereof with respect to conveyor travel direction, is in the form of a hinged flexible flap 11 hung downwardly at a backwardly inclined angle from a pivot mounting pin at its upper edge. The lower free edge of the flap drags or sweeps on the upper surface of the traveling buckets to afford a wiping seal which restrains outflow of the loose material and levels the load with the bucket top surface.

In the machine as in FIG. 1, the projecting flanges 2 at the trailing edges of the buckets traveling through the loading station are above, in each instance, the leading flanges 2 of next succeeding buckets and are conditioned to rise as each bucket passes around or negotiates the turn into the ascending or elevating section of the circuit. The same overlapping flange relation is resumed as the buckets pass the turn at the top of the ascending section and into the upper horizontal section leading to the high level unloading stations. Accordingly, the lowermost forwardly projecting flanges present no interference to a forward tilting of preceeding buckets as they come successively into the regions of unloading stations.

At each such station, certain buckets are turned upside down and dump their contents. Thus unloading stations in the forwardly advancing upper section overlie laterally inclined discharge chutes 12 leading to one side or the other of the machine. Inasmuch as the overlapping flange relation would tend to cause an undesirable tilting of still loaded buckets as they move downwardly around the end return sprocket 7, an arrangement is provided to reverse the overlapping flange relation beyond the last of the uppermost unloading stations and the head of the loop end. This conveniently consists of a rotatable wheel or pair of transversely spaced apart wheels 13 mounted in the machine frame by a shaft 14 to bear downwardly on and depress the buckets as they pass under the wheel. A short break in track continuity below the wheel rim allows the chain and bucket pivot pins 3 to dip as they move under the wheel but fore and aft of the track break, the pivot axes will be slightly above the bottom of the wheel 13. Therefore, as the leading edge of any traveling bucket comes into engagement with and is depressed by the wheel, the bucket will tilt forwardly and at the same time the pivot pin of the preceding bucket will have moved ahead or beyond the wheel and its trailing edge will be depressed to tilt the bucket rearwardly and thereby raise its forward edge and with it the overlapping or trailing edge of a preceding bucket. The two adjoining buckets are thus tilted oppositely to one another and their short length overlapping flanges slip off of one another so that the foremost bucket restores itself and presents its trailing edge below the leading flange of the next succeeding bucket. With short length flanges, the tilting needs to be very slight and is insufficient to shift the load and reversal of the flanges conditions them to clear one another in preparation for following the chain assemblies 5 around the return wheel 7.

As each bucket begins its return travel from the loop end wheel 7 and into the bottom horizontal section of the elevated leg, what was previously the trailing flange becomes the leading flange and settles down over the trailing gap-closing flange 2 of the preceding bucket and will be lifted to accommodate forward tilting of a preceding loaded bucket to be dumped at any unloading station traversed thereby.

At the juncture between the elevated section of the lower chain reach and the upper end of the return descending section of the circuit, a guide bearing bar 15 is preferably provided for engagement of its lower horizontal edge slidably by the upper surface of succeeding buckets and restrains tilt of horizontally traveling buckets. At this point any bucket whose trailing flange 2 overlaps the forward flange of a succeeding bucket will tilt forwardly as its descent begins and until its rearward flange slips off and clears the next succeeding bucket. At the bottom of descent, the travel path turns into the lower horizontal section of the back stretch and the forwardly projecting flanges 2 again settle down on top of trailing flanges. To reverse this relation in advance of travel around the end sprocket wheel 6, a striker or camming plate 16 is mounted to be engaged with bucket portions below their pivot axis so as to tilt the buckets forwardly an amount to move their trailing flanges upwardly and out from under the leading flanges of next succeeding buckets. Thereafter, the hanging buckets pass around the loop end wheel 6 and have their travel direction reversed for passage beneath the loading hopper 10 with forwardly projecting flanges in underlapping relation with rearwardly projecting gap closing flanges of preceding buckets.

Bucket upending mechanism shown in FIG. 1 is substantially the same at each unloading station and involves a frame mounted and transversely disposed rockable selector shaft 17 having a radially projecting abutment or stop lug 18 and a frame mounted bucket positioning or camming bar 19 extending longitudinally along one side of the travel path of the buckets and having an upper horizontal tracking edge 20 (see FIG. 5) terminating forwardly in a vertical abutment or stop shoulder 21 in given rearwardly spaced relation behind the stop lug 18 for their co-operation in tandem relation. At one end, the selector shaft 17 (see FIG. 3) terminates in an operating handle or lever 22 by which it can be manually shifted both axially and rotatably between angularly related operative and inoperative positions.

The frame supported shaft bearing adjacent the handle 22 has a transverse slot or keyway groove 23 on its interior face for reception, either above or below the shaft axis, of a radial pin or key 24 for locking the shaft against rotary displacement. At its opposite end, the selector shaft 17 has a reduced diameter pin bearing portion slidably fitted to the frame wall and surrounded by a compression coil spring 25 interposed between the frame wall and a shoulder formed by the stepped diameter portions. Elastic spring force acts on the shaft to yieldably resist axially sliding movement thereof and maintain the key 24 within the keyway 23 but the spring yields to manual pressure on the operating lever 22 to move the key 24 out of its slot and accommodate rocking of the shaft between its angularly related positions. In one of such angular positions, the radial stop abutment 18 extends vertically upwardly from the shaft and in the other position the stop abutment projects downwardly below the shaft and below the path of the traveling buckets so as to be ineffective. In FIG. 3 the relation of the adjustable selector parts is shown in operative position by full lines and in an intermediate position of adjustment by broken lines. For co-operation with the stops 18, any desired number of buckets will be provided, each with an abutment lug 26 depending from the bottom of the bucket and transversely positioned in longitudinal alignment with a selector stop lug 18. As each such bucket travels forward, the front face surface of its dependent abutment 26 will strike a selector lug 18 and momentarily stop travel of the dependent abutment lug 26 while continued bucket travel pulls the bucket pivot axis along and results in a bucket tilting or tipping action. Such tilting forward of the bucket lowers its leading edge and also a pin 27 projecting laterally from the bucket side wall at a point spaced above the bottom of the bucket and near the top of the bucket ahead of the pivot axis. The lowering of the side pin 27 brings it into engagement with the vertical stop surface 21 of the camming bar 19 and continued bucket movement while the lateral pin is stopped, results in additional forward tilting of the bucket and raises the trailing end of the bucket away from the selector bar 17 to an inverted position slightly short of complete upside down relation so that the bucket center of gravity remains behind the pivot axis. This inverted position for dumping the load is maintained in the traverse of the unloading station by the lateral pin 27 rising above the end stop 21 and tracking slidably on the top guide surface 20 of the camming bar 19. Instead of an abrupt ending of the top surface 20 and fast return of the emptied bucket into banging contact with a preceding bucket, the camming bearing surface 20 terminates rearwardly in a downwardly receding portion on which the tilting pin 27 rides for allowing initiation of the back tilt. The free end of a swingable restraining arm 28 pivoted on the frame on a transverse axis drops against the bucket and fits itself to an adjacent flange projection 2 as a fulcrum contact during gravity swing return of the bucket to a free hanging condition as the lateral pin 27 leaves the camming bar 19.

When the selector bar 17 has been rocked to shift its stop 18 from an upwardly projected position to an ineffective downward position, no tilting of the buckets occurs and the lateral tipping pins 27 will remain above the level of the camming bar 19 whereby the buckets ride past the station in normal hanging relation. While the same unloading operation takes place at each station, the control of which buckets are to be unloaded at any station is by the relative longitudinal alignment of the selector shaft stop pins 18 and the bucket tilting pins 26. For selective aligned relationships, the respective pins may be interchangeable and detachably secured at different transversely spaced points on either or both the selector shaft 17 and the bottoms of the buckets 1. Alternative pin positions on the bucket are shown by full and broken lines in FIG. 4 and any one of these positions can be selected beforehand. For example, the central full line position conditions the bucket for co-operation with a centrally disposed stop pin 18, as on the upper selector shaft 17 in FIG. 3, and an abutment pin 26 in offset position toward the right will line up with the transversely offset stop pin 18 on the lower selector shaft 17 in the same view. Different longitudinal alignments of the pins are to be set up for each unloading station. For convenience, FIG. 1 shows a succession of three buckets being dumped simultaneously at each station but no particular grouping or proportionality of buckets to be dumped at any station is required and the number of buckets to be dumped at any point and the intervals between the successive buckets to be unloaded can be set up to suit predetermined specifications.

In lieu of unloading station locations in the return loop section of the traveling circuit, an unloading arrangement at the end of the circuit can be provided, as in FIG. 5, wherein lateral projecting pins 27 on the buckets come into engagement and co-operate with abutment lugs 28' carried near the periphery of the return end sprocket wheel 7. The abutment lugs 28' are circularly spaced apart a distance corresponding with the longitudinal spacing between the pins 27 of succeeding buckets and as the wheel rotates clockwise, as illustrated, each rising abutment 28' moves into contact with and behind a lateral pin 27 and maintains engagement for turning the bucket upside down in its path around the wheel. Each bucket, whether or not it has been unloaded previously, is upended. When it enters the lower return horizontal path, its pivot support pin 4 passes beyond the vertical plane of the wheel axis and the lateral projection 27 is lifted by the rising wheel carried lug 28' and the bucket center of gravity shifts rearwardly of the pivot axis whereupon the weight of the bucket swings it in clockwise direction. A frame carried and longitudinally projected stop and guide bar 29 is in the path of the bucket projection 27 and holds and guides the bucket in upright position and presents its forwardly projecting flange 2 in underlapping relation with the trailing flange 2 of the preceding bucket.

Especially for those installations in which the unloading stations are somewhat inaccessible for manual operation of the selector control shaft 17, there is contemplated a remotely controlled stop, such as shown in FIG. 6. This consists of a bell crank lever 30 mounted on a pivot axis 31 and connected at one end to a plunger of a solenoid or other suitable electric actuator 32 in circuit to be opened and closed by a selector switch at a control panel. By means of solenoid response, the lever can be shifted for presenting the free end thereof as a stop member into or out of longitudinal alignment with bucket tilt control surfaces such as the pins 26.

In FIG. 7, the traveling path of the endless chain assembly is counterclockwise and from the loading station the buckets ascend to a forwardly moving bottom reach of the upper leg of the loop circuit and unloading stations are located in this elevated bottom reach. In this case, the downwardly depending legs 26 are omitted and in place thereof a lateral projection or pin 33 is carried by each side wall having the tilt pin 27 previously mentioned. At each of the two unloading stations there is mounted a cam bar 34 adjustably positioned in the frame for selective transverse shifting to and from longitudinal alignment with the path of the traveling pins 27 and 33. In one position, the cam bars 34 are ineffective and in the other position they are operative to upend the buckets. For that purpose, the top surface of the bar has upper and lower stepped portions 35 and 36 with an intervening vertical shoulder 37 and a forward vertical edge 38. The edge 38 is adapted to be contacted first by the lower lateral pin 33 and as the bucket moves forward it is initially tilted to lower the lateral projection 27 into alignment with the shoulder 37 to further tip the bucket for complete unloading. In the final upending of the bucket, the lateral projection 27 rides on the upper bar surface 36 and then down the declining terminal portion of the bar, during which the bucket tends to right itself under control of a pivoted restraining lever 39 which co-operates with the trailing flange 2 in cushioning the final swing to upright position. In this instance, the buckets can dump directly downwardly into a bin, or if a sidewise discharge is desired, an inclined chute can be mounted beneath the discharge station. In FIG. 9 a centrally pivoted door 40 having a hinge axis 41, is shown in position for directing material toward the right. This door 40 can be swung in a counterclockwise direction to provide a side discharge toward the left of FIG. 9.

While the construction illustrated in the drawing has been described in detail, it is to be understood that various modifications can be made without departing from the invention set forth in the appended claims.

What is claimed is:

1. Bucket upending mechanism for use with a succession of material carrying buckets pivotally suspended on transverse axes by an endless loop conveyor and being characterized by bucket abutments against which the buckets are brought successively into engagement and caused to be swung by conveyor travel to upended relation, a longitudinally extending bar below the path of conveyor travel for upended bucket slide engagement and a gravity swingable lever arm pivoted on an axis above the path of conveyor travel and extended in the direction of conveyor travel to a bucket engageable terminal with which each bucket bears as the bucket passes from said bar and is thereby freed to swing back to upright position, said swingable lever arm serving with its engagement with the bucket to check the rate at which the swinging bucket returns to upright position with additional conveyor travel.

2. Bucket tilting mechanism for use with a succession of buckets pivotally suspended on transverse axes by an endless loop conveyor and for unloading at any of a number of stations and being characterized by downward abutment projections on the buckets, each at a given location transversely spaced from others, an adjustable rock shaft at each unloading station, an upward abutment stop projecting radially outwardly from each rock shaft and positioned at given transversely spaced relation with abutment stops of other rock shafts and in the longitudinal travel path of selected downward abutment projections aforesaid and for engagement thereby to effect bucket tilting with conveyor travel and means pivotally mounting each rock shaft for its oscillation for shifting its abutment stop at will into and out of said travel path.

3. Bucket tilting mechanism as in claim 2 wherein the rock shaft mounting means accommodates axial slide movement of the shaft together with a key and groove positioning connection with the shaft in one axial position and spring means active on the shaft and yieldably resisting shaft axial movement in a direction to release said key and groove connection.

References Cited in the file of this patent

UNITED STATES PATENTS

| | | |
|---|---|---|
| 552,664 | Hunt | Jan. 7, 1896 |
| 683,604 | Hunt et al. | Oct. 1, 1901 |
| 1,342,789 | Anderson | Jan. 8, 1920 |
| 2,435,498 | Hapman | Feb. 3, 1948 |
| 2,610,748 | Larham | Sept. 16, 1952 |
| 2,729,531 | Andersen | Jan. 3, 1956 |
| 2,925,902 | Bianchi | Feb. 23, 1960 |

FOREIGN PATENTS

| | | |
|---|---|---|
| 385,009 | France | Feb. 22, 1908 |